INVENTORS
RICHARD N. JACKSON
KEITH E. JOHNSON
BY
Frank R. Trifari
AGENT

INVENTORS
RICHARD N. JACKSON
KEITH E. JOHNSON
BY
Frank R. Trifari
AGENT

Dec. 23, 1969 R. N. JACKSON ET AL 3,485,946
METHOD FOR TRANSMITTING AND RECEIVING EDUCATIONAL TELEVISION PROGRAMS
Filed June 9, 1966 3 Sheets-Sheet 3

INVENTORS
RICHARD N. JACKSON
KEITH E. JOHNSON
BY Frank R. Trifari
AGENT

United States Patent Office 3,485,946

Patented Dec. 23, 1969

3,485,946

METHOD FOR TRANSMITTING AND RECEIVING EDUCATIONAL TELEVISION PROGRAMS

Richard Norman Jackson, Horley Surrey, and Keith Eric Johnson, Smallfield, near Horley Surrey, England, assignors, by mesne assignments, to U.S. Philips Corporation, New York, N.Y., a corporation of Delaware Filed June 9, 1966, Ser. No. 556,519
Claims priority, application Great Britain, June 15, 1965, 25,240/65
Int. Cl. H04n 7/08
U.S. Cl. 178—6 10 Claims

ABSTRACT OF THE DISCLOSURE

An educational television program system in which a plurality of instruction frames constituting the educational program are consecutively and repetitively transmitted to multiple receiving locations with appropriate identifying signals for the various frames. At the receiver a desired frame is selected by means of its identifying signal and stored for display. When an appropriate response is made to the information contained in a given frame by the proper actuation of the receiver circuits, a succeeding frame then becomes available for observation.

Figure 1:
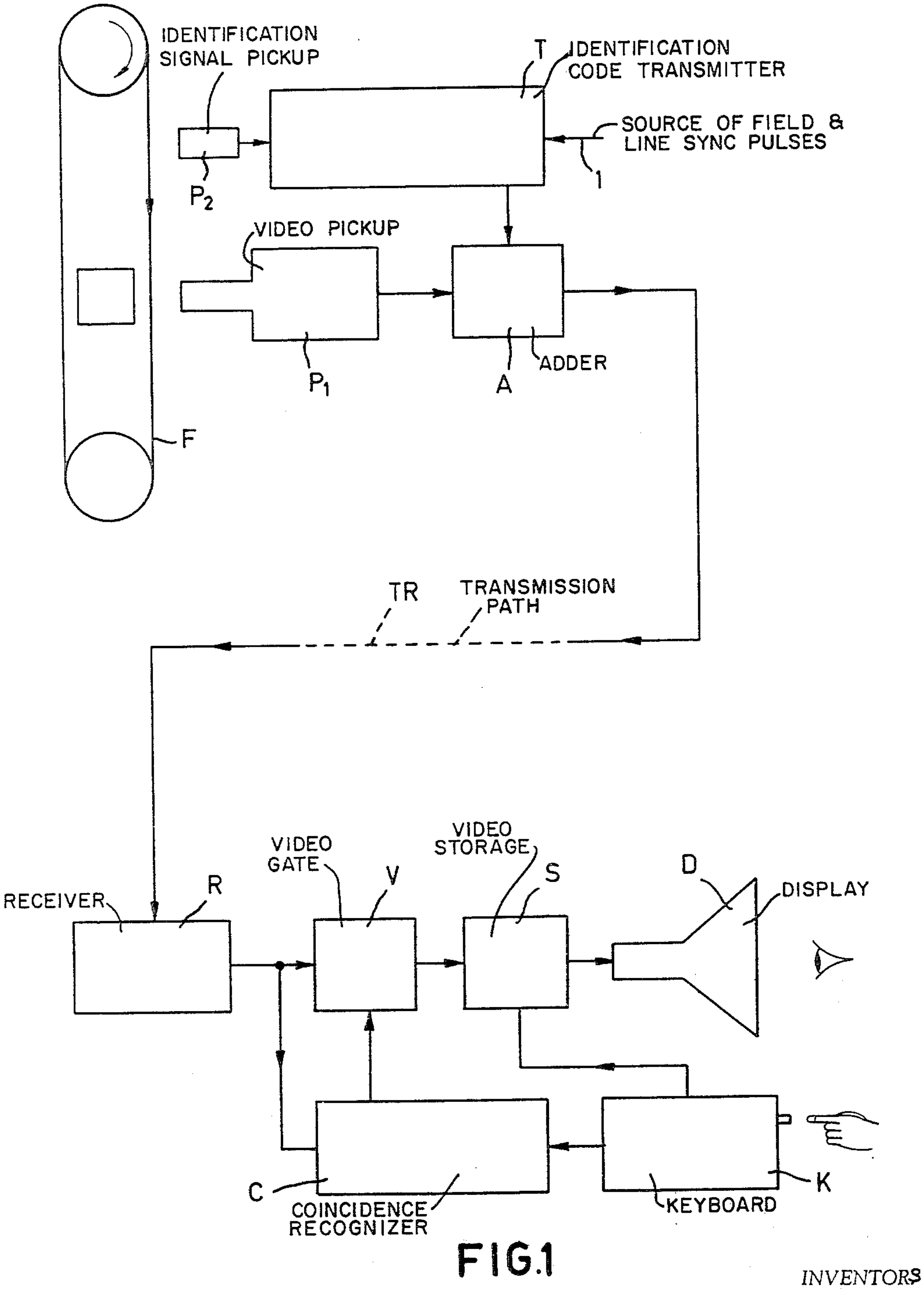

This invention relates to an information transmission system, comprising a transmitter and a plurality of receivers.

The role of television in education is being widely studied, both as a "visual aid"—for instance to assist in demonstrations—and as a medium for the dissemination of learning to a wide audience.

The technique of programmed instruction is also rapidly gaining ground and there is much effort devoted to the design of equipment for presenting visual and aural "programmes"—the so called "teaching machines."

So far there has been little attempt to bring these two streams together. This is in spite of the fact that, on the one hand the usefulness of television as a means of visual display is well established; and on the other there is little doubt that the inclusion of programming techniques would greatly increase the effectiveness of television teaching.

In the United States television is being brought into the programmed instruction field, at least at the research stage. There, the uniting factor is an interest in teaching installations in which a multiplicity of students are taught by means of a central teaching system. One example of such a system is that of computer teaching. It is valuable to make use of the logic and memory facilities of a computer to provide a more versatile teaching programme for the student. However, this only becomes economic when the computer time is shared between a number of students. Television may be effectively employed to give a large number of simultaneous output displays of the programme material.

The chief obstacle to the use of television for programmed instruction—and that which has most probably been the reason for its slow development in this role—is that normally television is a one-way or "open-ended" system, whereas it is a basic principle of programmed instruction that there should be a measure of "feedback" from the student to the "teacher". The way in which this feedback operates is best understood by considering how the normal practice of programmed instruction is carried out. The following brief descriptions of programmed instruction and of teaching machines have been extracted from the book "Teaching Machines and Programmed Instruction" by E. B. Fry (McGraw-Hill Book Company, Inc., New York, N.Y. 1963) starting at pages 2–3 of Chapter 1:

"Although there is something less than unanimous agreement on the psychological principles involved in a programmed instruction situation, here are some which are most agreed upon:

"(1) The subject matter is broken up into small units called frames. In actual practice, these frames usually vary in size from several sentences to several small paragraphs.

"(2) At least part of the frame requires some type of response from the student. He must answer a question or fill in a blank. Active participation on the part of the student is required. Generally, it is desired that the activity also demonstrate understanding of the material.

"(3) The student is provided immediate feedback reinforcement. He is told the correctness of his answer, which has the advantage of immediately reinforcing the activity or immediately correcting a misunderstanding. Since many programs are written in such a way that most of the students' answers are correct, the act of telling the student that he is correct becomes a reward or reinforcement. Thus such programs have a much higher amount of reward or reinforcement than most ordinary teaching situations.

* * * * *

"(7) The student is usually free to vary his own rate of learning. A student may work through a program rapidly or slowly. He is completely independent of others in the class. Traditional methods such as lectures or motion pictures force every student to proceed at the same rate, which might be too fast for some and too slow for others."

Teaching machines are devices for presenting programmed instruction to students. Clearly such devices must have certain basic properties. Fry, in a later part of the same book (Chapter 1, pages 8–9) lists some of these:

"The close relation between machines and programs is readily apparent when one compares the basic characteristics of a teaching machine with the basic characteristics of a program. Most teaching machines are so designed that they:

"(1) Present subject matter in small units, usually consisting of a few sentences or a paragraph;

"(2) Require the student to respond to each of these items by pushing a button or writing a word;

"(3) Inform the student of the correctness of the response as soon as it is completed, either by showing the correct answer or be moving forward to the next frame when a question has been answered correctly."

Another important attribute in some machines is the ability to "branch." This is often done by using the technique known as "multiple choice," as explained on page 5 of chapter 1:

"The multiple-choice program offers the student a number of alternative answers to the question posed at the end of each frame, requiring him to choose one of them. Usually, multiple-choice programs are arranged in branches; the actual branch taken by the student is determined by his answer to any particular question. As already mentioned, this is often referred to as an intrinsic program, since each reply leads the student into a different route."

Some teaching machines which can make use of this branching technique are now available. The method of operation varies but the following method is typical of one type of machine. Various subjects are recorded on microfilms which can be inserted in the machine. By operating a switch a screen lights up, a particular problem is explained, then a question is asked and several answers are listed. From these the correct one has to be selected by pressing one of a set of buttons. At once the student is told whether his answer is correct. If it is, he receives more information and is given a further choice of answers.

If it is not correct he is told why his answer is wrong, and requested to press a "Return" button. This button brings him back to the original frame, and gives him another opportunity to select the right answer.

It can be seen that in such a device the instruction, including the information as to the correctness or otherwise of the responses, is contained in the film programme. The function of the machine is to display this instructional material to the student and to control it so that the material appropriate to the student's response is selected.

With this type of machine it is only possible to instruct one student at a time. If a large class of students is to be taught, each student must have his own machine. Each machine, in its' turn, must have a copy of the film programme so that large numbers of films and machines are required. Also the capability of the machine to "branch" is limited.

In the description given "branching" simply means going to a single frame giving an explanation and returning to the original frame. Similar machines have been described which employ more elaborate branching techniques but these, in general, do not have multi-student display facilities and tend, because they are more complex, to cost more. It is an object of the present invention to provide systems capable of giving programmed instruction to a large number of students simultaneously and in such a manner that access to the programme frames is unrestricted except in so far as the educational requirements of the programme dictate.

When the question of providing multiple student display arises it is natural to consider the use of television for the purpose. However, the difficulty with this is that, as has been shown above, it is a principle of programmed instruction that each student shall proceed at his own rate through the programme material. Normally in television all viewers (students) must watch each part of the programme simultaneously and thus all viewers proceed at the same pace. It is also not normally possible for students to take different programme "branches." The other difficulty already referred to is the necessity to provide a response channel from the student (or viewer) to the programme source, which is very difficult for the case of broadcast television teaching although much easier for closed-circuit operation.

Methods of overcoming the response difficulty for broadcast television are receiving attention in the U.S., but none of those so far proposed appear to be capable of self pacing. Closed circuit television is used in a self-pacing system in the University of Illinois "Plato" class teaching project. In this project the access problem is solved by incorporating what is called an "electronic book." This is, in effect, a separate television picture pick-up unit for each frame of the programme, these pick-up units all operating continuously in parallel so that all the frames are available effectively all the time. Each student may thus switch to any picture source to obtain the frame of his choice. Clearly the cost and complexity of the programme originating apparatus is a decided disadvantage of this idea, quite apart from the fact that it does not lend itself to broadcast (as opposed to closed-circuit) applications.

A further object of the present invention is to make possible the use of television for broadcast eduction using the programmed instruction technique, including the desirable features of allowing students to proceed at their own pace and make responses to the material. It is also an object to permit simplification of the apparatus requirements for closed-circuit television teaching using programmed instruction.

According to one of its aspects the present invention is characterized in that the system comprises means at the transmitter end for transmitting, in order to obtain a method of time-sharing between various frames of the information as signals representing successive frames of a programme which is repeated cyclically together with frame identification signals, recognizing means at each receiver for recognizing said identification signals, selecting means at each receiver for utilizing said identification signals for selecting a desired frame and storage means at each receiver for storing and displaying the selected frame for a controlled period. (In this context the term "frame" is used to denote one of a plurality of discrete consecutive parts into which the information is divided; such information may be, typically, visual information divided into television-type frames.)

In a practical example of this transmission system as applied to programmed instruction by television it is characterized in that all of the frames of the programme are recorded in succession on a single strip of video tape or cine film which is run continuously in a video or telecine machine at the transmitter end. Each successive television frame therefore contains a separate and distinct piece of educational information. Each frame can be identified and selected at any of a number of receivers and stored in the particular receiver for continuous display e.g. until a fresh selection is made.

The system may be one wherein the transmitter is adapted to operate so that each frame has associated with it an identification signal which differs from the identification signals of all other frames and wherein the recognition and selection means at each receiver are adapted to recognize any one of said identification signals.

Alternatively, the system may be one wherein the transmitter is adapted to operate so that the identification signals are constituted by a reference signal occurring at one point in the programme, and wherein the recognition and selection means at each receiver are adapted to detect each reference signal and thereby initiate a count of a number of frames such as to terminate at the desired frame (in this case the reference signal may, if desired, occupy a whole frame or frame period at a point which is, for example, at the start of the programme).

As a further alternative a combination of the above two modes of operation can be adopted, namely, a plurality of identification signals may be transmitted during each programme cycle, each signal being spaced from the next one by a whole number of series of fields.

Whichever mode of operation is adopted, the system has several advantages for large scale programmed instructional teaching situations. As applied to the television case the system makes possible broadcast "over air" television instruction which can comply with the rules of programmed instruction—including those of student response and of self-pacing. This is accomplished by using the normal television channel to make available the whole teaching lesson to each student's display. Each student then proceeds to use this material in his own individual way. Both simple linear and branching programmes are possible, a brancing programme being one in which there are alternative sequences of instructions which are followed according to the responses of the student to the questions.

Figures 2A, 2B, 2C, 4A, 4B, 4C:
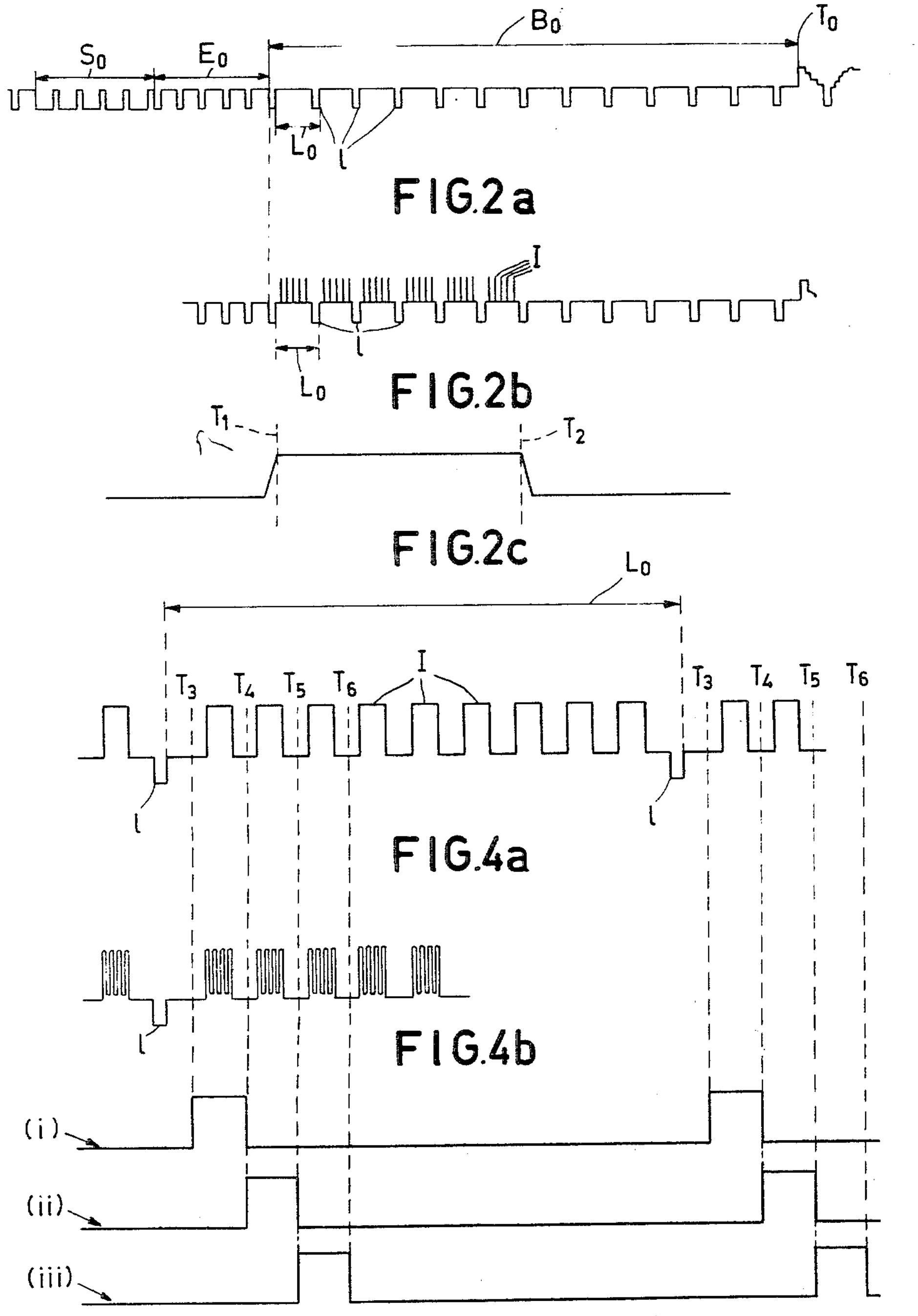
Figure 3:
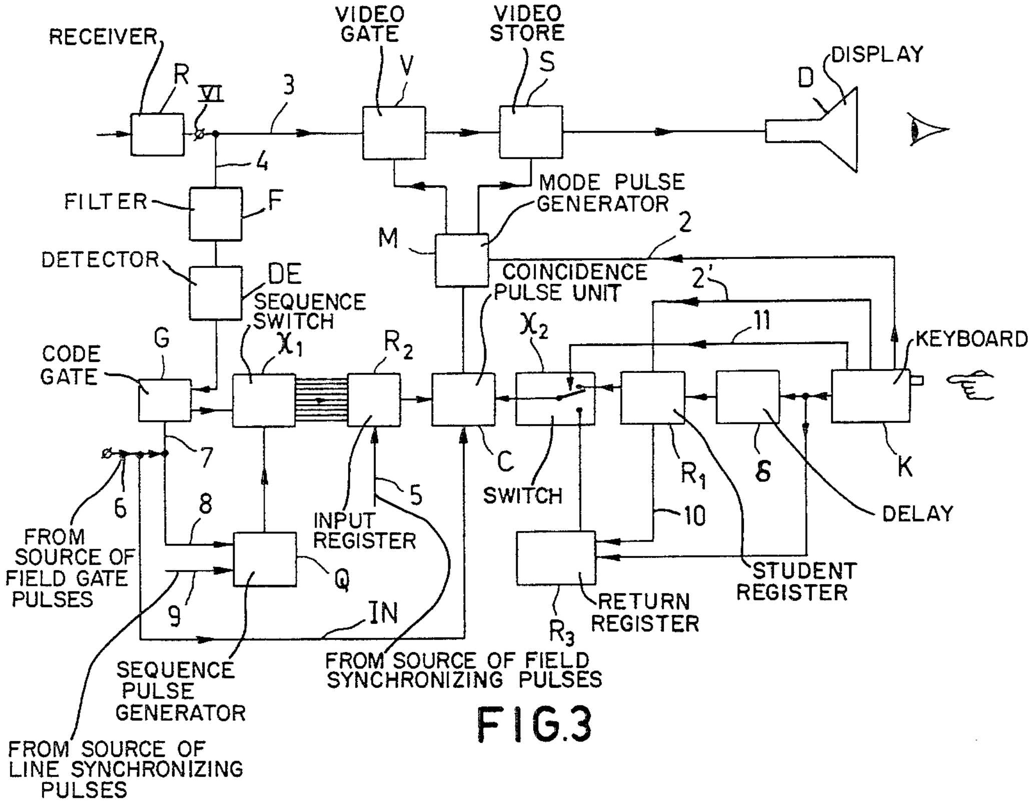

An embodiment of the invention will now be described by way of example with reference to the accompanying diagrammatic drawings as applied to programmed instruction by television, in which FIG. 1 shows schematically a transmitter with means for transmitting the information as signals representing successive frames of a programme which is repeated cyclically together with frame identification signals and one receiver with additional equipment at the students end FIGS. 2*a*–2*c* show several signals used in the system FIG. 3 shows a more detailed block diagram of the equipment used at the students end, and FIGS. 4*a*–*c* show further signals used in the system.

The means at the transmitter comprise, in this example, a closed loop of cine film or video tape F which contains all the frames of a teaching programme recorded once or, if desired, a whole number of times. This loop circulates continuously at television speed: for example, if the frame frequency chosen is 25 frames/sec. and the number of frames constituting the programme is 75, the loop will be circulated at such speed that the programme is transmitted once every three seconds.

A pick-up unit P1 scans the frames and produces a video signal, such pick-up being e.g. of the flying spot type.

The loop carries also primary frame identification signals. If these are located in the frames they may be picked up by the same pick-up unit P1 but in the more general case illustrated they may be arranged in a different manner on the loop and may require a separate identification pick-up device P2 (the position of P2 is purely schematic and does not imply that an identification signal is necessarily recorded on the loop at a position spaced from the corresponding frame).

The processing of the primary identification signals is explained below.

In FIG. 1 only one of a plurality of receivers is shown for the sake of simplicity. Each receiver has coincidence recognition means C for recognizing the identification signals and utilizing them for selecting a desired frame, and further units for storing and displaying the selected frame. The latter units are fed with video signals via a video gate V which is controlled by the frame recognition and selection means. The latter include a coincidence recognition unit C arranged to open the video gate V for a period corresponding to a desired frame which has been requested by a keyboard K response unit operated by the student.

The system of FIGURE 1 may be one wherein the transmitter is adapted to operate so that each frame has associated with it an identification signal which differs from the identification signals of all the other frames of the programme and wherein the recognition and selection means at each receiver are adapted to recognize any one of said identification signals. Alternatively the system of FIGURE 1 may be one wherein the transmitter is adapted to operate so that the identification signals are constituted by a reference signal occurring at one point in the programme, and wherein the recognition and selection means at each receiver are adapted to detect each reference signal and thereby initiate a count of a number of frames such as to terminate at the desired frame. Intermediate modes are possible and one mode will be described in greater detail.

In the system illustrated in FIGURE 1, the transmission path TR shown may be the radio "over-air" path of a normal broadcast system or one of a number of cables connected in parallel to a number of receivers in a closed circuit system. If used as a broadcast system, the complexity of the central unit is relatively small and that of the student's display is relatively high. However, this need not be the case, or need not be so to the same degree, in the case of a closed circuit system since it is then possible to retain the recognition functions (and possibly the storage as well) in the central unit. In this case the television link can be used to supply only the required information to the student, and return cables from all the receivers can be used to actuate corresponding response or logic units located at the transmitter.

If the video storage S and display means D (e.g. the storage and display means of FIGURE 1) employs only one store S, then an access time is involved in the obtaining of each new frame by the student, such time being never greater than the circulation time of the programme at the transmitter and being typically a few seconds. However, this access time can be eliminated by the provision of one or more additional stores in each receiver. In the case of a linear (non-branched) programme, one extra store is sufficient: while the first store is providing the present frame, the second store has the next frame written into it in readiness for instant display; on actuation of the response unit, the display device is switched to the second store while the first is erased and then supplied with yet another frame.

The operation of the system of FIG. 1, and of a more specific version thereof, will now be described in greater detail.

The transmitted programme can be the same as a normal television film (or tape) transmission except for two aspects. First, the film (or tape) programme itself is continuously repetitive so that the same sequence of frames is repeated many times. Second, there are included in the transmitted waveform special signals which form an identification code serving to uniquely identify each of the frames of the programme. Typically, these special signals may take the form of a series of pulses added to the video waveform during some period when there are no picture signals present.

There are a number of ways in which this may be accomplished but one very convenient method is to make use of the intervals of field blanking which occur between successive fields of a normal television signal waveform. FIGURE 2(*a*) shows part of a typical television waveform during such a period. There is shown a waveform for an interlaced 625 line system at the start of an even field. The field synchronising pulses are shown during a period $S_0$ and also equalizing pulses during a period $E_0$. The start of the first line of the picture is at the moment $T_0$. Between the period $E_0$ and the moment $T_0$ it is normal practice (e.g. for the 625 line system) to transmit in a period $B_0$ 12½ lines which are devoid of picture material and therefore produce only a horizontal black band on a normal television receiver. It is usually arranged that these lines are hidden by the mask or escutcheon of a television receiver and are not visible in the picture. Since this is the case additional signals may be added to these blank lines which will not be seen by the normal viewer. There may be, for example, some 500 different frames in the teaching programme, each of which must be recognised. This recognition may be accomplished by including a multiplicity of pulses during the blank lines. These pulses may be used to denote the respective digits of (for instance) a binary code. The number of pulses required will be governed by the number of digits necessary to provide a unique identification of each of the frames of the programme. If the programme has 500 frames ($2^9=512$), and the code being used is binary, then *nine* pulses will be required. It will be evident, however, that if another number of frames per programme is required, another number of pulses can be used. So in general $n$ pulses must be transmitted per line period $L_0$, whereby $2^n$ is larger than the number of frames per programme. Each frame of the programme will be identified by the presence or absence of the respective digit pulses, there being 512 unique combinations for a nine-digit binary code.

FIGURE 2(*b*) shows how the code or identification pulses I are inserted in the video waveform during the aforesaid blank period $B_0$. Five out of the aforesaid nine pulses are shown on each line and this is repeated during six lines of the period $L_0$. This corresponds by way of example to the binary number 101010101 which is equivalent to the decimal number 341 when after each pulse present, one pulse is omitted. It will be clear that, as known from the digital technique, each number between 0 and 500 can thus be indicated by means of these nine pulses per line. FIGURE 4(*a*) shows one out of the six lines of FIG. 2(*b*) to an enlarged scale, but in this case all nine identification pulses I are shown as present. Such a line $L_0$ is started and ended with a line sync pulse 1.

The transmitter for such a system must contain all the essential elements of a normal television film or tape transmitter plus means for producing the required code pulses. It is convenient to refer back to FIGURE 1 in order to describe that system in greater detail as applied to filmed frames. Here it is assumed that a primary identification code is printed on the film F (e.g. on the optical or magnetic track normally used for sound signals for films). This is an advantage since it helps to ensure that a correct relationship between code numbers and film frames is held.

The picture information is picked up via the frame pick-up device P1 and primary identification signals are picked up via device P2. In some cases (e.g. if the sound track of the film is used) the timing of these pulses will not be correct for insertion in the video waveform. Thus the primary identification signals are passed to identification code translator T. The function of unit T is to receive the primary identification signals and translate or convert them to a suitable form. As illustrated, these pulses are passed to adder circuit A, where they are added to the video waveform obtained from device P1. In order to ensure that the pulses are passed on at the correct time, field and line synchronising pulses are also fed through input terminal 1 into unit T to control the timing.

It should be noted that whereas there is one unique number allocated to each programme *frame*, this frame is transmitted normally as two successive (interlaced) television fields. In the system as here described the appropriate code is inserted in the blank period $B_0$ immediately preceding each of the two fields comprising a frame. However, other methods such as inserting the identification signal only in the first field could be adopted. Then a whole number or series of frames, constituting one programme, is displayed and then again an identification signal is given to identify the next programme.

At the receiver the code pulses relating to the transmitted pictures must be recognised and the appropriate picture must then be displayed to the student. The operation of the receiver will now be described with reference to FIGURE 3.

As the commencement of an instructional programme the student is (e.g.) seated facing the display unit D and has some form of input keyboard, K, incorporating push buttons, keys or other devices for registering his response to the programme. First he is instructed, probably by an instruction sheet or a human instructor in the first instance, to (e.g.) press a certain button or buttons to initiate the programme. When any chosen button is pressed, a "clear" pulse is sent via delay unit $\delta$ to Student Register R1 (and direct to Return register R3 as will be explained later). Unit R1 is a unit capable of storing binary coded information and when the "clear" pulse is received, all previous codes are wiped out and all stages of the register are set to the zero state.

The action of pressing the buttons of the keyboard causes a code which is appropriate to the first frame of the programme to be set up. When the necessary buttons are correctly set the student then presses a further button in the keyboard marked "operate." This results in two trains of action. First an "operate pulse" is despatched through lead 2 to "Mode pulse Generator" M. Unit M then generates a sequence of switching pulses which are used to operate video store S. The store S must first be erased so that any previous signals are removed and then (for some types of store) primed so that it is ready to receive new information. Secondly at the same time as the storage cycle is initiated by applying the "operate" pulse through lead 2 to the generator M the code relating to the first picture is fed through lead 2′ into the student's register R1 where it is stored.

The video signals from the transmitter (after detection in a receiver R if a broadcast or carrier closed-circuit system is used) are applied at video input terminal V1 and are then passed through lead 3 to video gate V and through lead 4 through filter F and detector DE to code gate G. The code gate G is caused to open by field gate pulses which may be derived from the field time-base of the receiver R.

This occurs at each interval when a sequence of signal code pulses is expected. The timing of the field gate pulses and the opening and closing of gate G is indicated in FIGURE 2(*c*), in relation the identification code pulses (FIGURE 2(*b*). Each field the code gate G is opened at the moment T1 and closed again at the moment T2. Pulses are shown in FIG. 2(*c*) may be obtained from a monostable multivibrator (not shown) which is always initiated to its unstable state at the moment T1 by delayed field synchronising pulses and returns to its stable state at the moment T2. The field gate pulses (FIG. 2(*c*)) are applied to input terminal 6 and fed to gate G via lead 7.

After passing through the code gate G the signals (which are only those occurring during the interval T1→T2 and appropriate to the six lines of each field which carry the identification code pulses as shown in FIG. 2(*b*)) are passed via a sequence switch X1 to an Input Register R2. The timing of the operation of switch X1 and its manner of connection to the register R2 are such that each digit of the incoming code is routed to an appropriate part of the register. Thus, at the completion of each of the six lines of code pulses, the binary number appropriate to the incoming video field is stored in the register R2.

This function is performed (in this example) six times as a safety precaution. In fact, having more than one line with code pulses helps to make sure that the register is set to the correct state. If one of the register circuits fails to go over (from 0 to 1) the first time, for instance, it should be correctly set subsequently. It also allows some latitude for the timing by the field synchronising pulses to open gate G at a later moment then T1. Although in the foregoing six times nine pulses are transmitted, it will be evident that those pulses can be transmitted a larger or smaller number of times just as the safety margin desires. So in general it can be said that *n* pulses should be transmitted *m* times, that means during *m* line periods $L_0$ of the blank period $B_0$. Of course *m* must be smaller than or can be at least equal to the number of line periods of said blank period $B_0$.

In order to operate at the correct time the sequence switch X1 receives during each line period $L_0$ nine pulses from sequence pulse generator Q. Generator Q in turn is controlled by the field gate pulses, obtained from terminal 6 and applied to generator Q via lead 8. Said field gate pulses initiate gonerator Q from the moment T1 to the moment T2. To generator Q are also applied through lead 9 line sync pulses obtained from receiver R. This is necessary because, as will be explained hereinafter, generator Q must repeat its delivering of nine pulses each line during the six lines the identification pulses I (FIG. 2(*b*)) are present.

FIGURES 4(*c*) shows how these pulses are related to the code pulses of FIG. 4(*a*). Only the pulses for the first three (out of nine) digits are shown: FIG. 4(*c*)(*i*) shows the train for the first digit pulse, 4(*c*)(*ii*) shows the train for the second digit pulse 4(*c*)(*iii*) shows the train for the third digit pulse, and so forth. The sequence pulses cause the sequence switch X1 (which is a 9-channel switch) to close at the desired times. So the first channel of switch X1 has to be closed each time at the moment T3 (which means that the first digit as shown in FIG. 4(*a*), if present, can pass through the closed channel of switch X1 and the appropriate connection to register R2) and opened the moment T4 by the first pulse train as shown in FIG. 4(*c*)(*i*). The second channel of switch X1 has to be closed each time at the moment T4 and opened at the moment T5 by the second pulse train as shown in FIG. 4(*c*)(*ii*). The third channel of switch X1 has to be closed each time at the moment T5 and opened at the moment T6 by the third pulse train as shown in FIG. 4(*c*)(*iii*) and so on, and so on. These times coincide with the expected arrival of the first digit of the recognition code (FIG. 4(*a*). When the sequence switch closes, this digit (if present in the signal) is passed to the appropriate part of the input register R2. The following digits are similarly switched to the register R2 in sequence, as controlled by the appropriate sequence pulses by generator Q. Thus at the end of each of the six sets of identification digit pulses the input register R2 is set to the state appropriate to the input field code. It is arranged that this register R2 is cleared or reset by field synchronising pulses, applied through lead 5, immediately *before* the arrival of the field code pulse train. In this way the register stores successively the code number appropriate to each successive field of the incoming signal.

Normally (i.e. unless the student has specified otherwise in a manner to be described) switch X2 is in such a condition that the student's register R1 is connected to coincidence recognition unit C. The unit C is also connected to the input register R2 and via an "inhibit" line IN, to the field gate pulse input terminal 6. Thus the coincidence unit C has three inputs. The first input from switch X2 indicates the number of the frame required by the student and the second input from register R2 indicates successively the numbers of the incoming picture frames. When the required number and the input number are identical, the coincidence recognition circuit C signifies this fact by producing an output which is fed to mode pulse generator M. This circuit is responsible for controlling the operation of video store S. For example, the store S may be an electronic storage tube so arranged that its screen must be erased and primed before writing in the signals corresponding to the new frame. In a system using such a store the action of the student in selecting a new frame number causes the store to be erased and primed. When the next coincidence is detected the mode pulse generator M will switch the store S to the "write" mode and will also cause the video gate V to open. The incoming video picture signal will then be written into the store. If, however, the store S is *not* in the correct state (e.g. erasing and priming have not been completed) then the signal from the coincidence unit C will be ignored and there will be a delay of one loop or programme cycle until the next coincidence occurs.

For other storage systems (e.g. magnetic tape) where priming is unnecessary, the mode pulse generator M automatically switches the store S to its writing mode on arrival of the coincidence pulse.

The third (or "inhibit") input IN stops operation of unit C during the code read-in period T1→T2 and thus avoids the risk of spurious coincidences.

After the required video frame has been written into the store, the mode pulse generator M automatically operates to close the video gate V and change the store S to the "read" mode. Thus the required video picture is repetitively read out to the display D so that the student can obtain the necessary instruction.

After the first frame of the programme the procedure is repeated except that (1) the instructions as to which buttons to operate are given to the student via the video picture and (2) extra circuits come into operation which take account of the possibility of an operating mistake by the student.

Referring to the description of programmed instruction methods and machines given in the preamble (before the statement of invention) it will be recalled that in a typical case the first frame might conclude by asking the student a question and giving him a choice of several alternative answers. The student will be instructed to press a button or buttons according to which answer he thinks is correct. When the student presses the buttons, the sequence of operations is as before. The first button pressed initiates the "clear" pulse which, after a delay, re-sets register R1. However, this pulse also clears a third register R3, known as the "return" register, *without* passing through delay $\delta$. When the students register R1 is cleared the contents of that register are passed through lead 10 into the return register R3. As before, the buttons pushed set up a code which is subsequently fed to R1 so that both the number required for the next frame and the number of the immediately previous frame are stored (in R1 and R3).

The rest of the procedure is as outlined above, the whole cycle operating so that a picture is displayed corresponding to the particular code number chosen by the student and set up by him by means of the keyboard. In this operation, there are three possible cases to be considered:

(1) Student selects correct answer and presses appropriate buttons or keys as instructed.

(2) Student selects wrong answer and presses appropriate buttons as instructed.

(3) Student presses, by mistake, keys which are *not appropriate to any answer.*

In the first two cases, when the buttons have been operated the appropriate frames are displayed. These frames will have been written with a knowledge of what answer by the student leads to their being selected. Thus the frames can contain information which either tells the student that he is correct and proceeds to the next step or tells the student that he is wrong and why. Further button instructions will then be given on these frames.

In the above case (3) (mistaken key operation), however, the frame selected may be quite unconnected with the questions asked, being selected at random from the whole programme. If this happens the student must be provided with some way of proceeding to a known point in the programme or he will be hopelessly lost. One way to achieve this is to provide a special button or key termed the "return" button or (as similar devices have been termed) the "help" button.

Operation of the return button of the keyboard causes a "return" switch pulse to reach switch X2 via lead 11 and causes the switch X2 to change over so that the return register R3 is connected to the coincidence unit C and the students register R1 is disconnected. At the same time the "operate" pulse is initiated through lead 2 so that the normal search procedure starts. When the cycle is complete the frame is displayed so that the student is taken back to the point at which he made the operating mistake and given another opportunity to proceed correctly.

In general, the FIGURE 3 lay-out is sufficient for true self-paced, branching teaching programmes. The student proceeds through the programme from point to point (frame to frame) his precise route being decided by his own individual answer at each frame and the procedure instructions being given in the frames. The "return" procedure should be an adequate protection against getting lost. However, there are a number of alternative possibilities within the invention. For example, it is possible to base the "return" procedure on other methods. Thus it is possible to have a fixed number stored in some simple way (geared to a return key or a help key) which leads to a special frame in the programme which frame gives a sort of "programme plan" for getting the student to within a few frames of where he needs to be.

A further improvement may be added to the system of FIG. 3 to improve the accuracy of recognition of the input frames in cases where, for example, there is interference or noise associated with the input signal to the receiver. In these conditions it may be possible for a noise or interference pulse to occur at such a time that it coincides with the opening of the sequence switch X1 and therefore is passed to the input register R2 having the effect of generating a spurious or wrong code number. Although the consequences of this are not disastrous (because the student can use the help or return facility) it is nevertheless most undesirable that this should occur.

The aforementioned improvement is to transmit "bursts" of some suitable frequency instead of the plain recognition pulses of FIG. 4(*a*). The form of these burst pulses is shown in FIG. 4(*b*) and may be compared directly with the pulses of FIG. 4(*a*). At the receiver a filter F and an envelope detector DE can be included (e.g. between the receiver R and the code gate G as shown in dotted lines in FIG. 3). The filter passes only the frequency of the burst pulses which are then detected. This filter can also remove much of the interference, and therefore the possibility of error, without otherwise affecting the recognition performance.

Reverting to the system of FIG. 1, if the identification signals are recorded within the frames on the film or tape, they can be picked up by device P1 without the need for a separate pick-up device P2. In this case device P1 may have two outputs, one connected to adder A as before and the other connected to the input of translator T in place of device P2. Moreover, the loop shown may in fact be an open length of film F or tape which is transferred from one reel to another.

What is claimed is:

1. A method for transmitting and receiving an educational television program of a plurality of instruction frames, comprising producing information signals corresponding to said frames, producing frame identifying signals, transmitting said information signals and identifying signals in cyclically repeated sequences, each said sequence including all of the information signals corresponding to all of said instruction frames, receiving said transmitted information and identifying signals, selecting the received information signals corresponding to a desired frame by means of said identifying signals, storing the information signals corresponding to said desired frame, and reproducing said desired frame in visual form from said stored information signals.

2. An information transmission system for the transmission of information signals corresponding to a program of a plurality of frames, said system comprising a transmitter and a receiver, said transmitter comprising means for producing frame identifying signals, and means for cyclically transmitting said information signals and identification signals in sequences, whereby the information signals corresponding to all frames are transmitted sequentially in each sequence, said receiver comprising means for receiving said transmitted signals, storage means, means responsive to said identification signals for applying information signals corresponding to a predetermined frame to said storage means, and transducer means for reproducing the information stored in said storage means.

3. An information transmission system for the transmission of an educational television program of the type wherein said program comprises a plurality of information frames, said system comprising a transmitter and a receiver, said transmitter comprising means for producing information signals corresponding to frames of said program, means for producing frame identification signals, and means for cyclically transmitting said information signals and identification signals in sequences, whereby during each sequence the information signals corresponding to successive frames are successively transmitted, said receiver comprising means for receiving said transmitted signals, storage means, means responsive to said identification signals for applying signals corresponding to a predetermined frame to said storage means, and means connected to said storage means for continuously reproducing said predetermined frame in visual form.

4. The system of claim 3 wherein said transmitter comprises means for transmitting the information signals corresponding to each information frame on the lines of separate image periods, and means for transmitting the image identification signals corresponding to each information frame during the flyback time preceding the transmission of the information signals corresponding to the respective frame.

5. The system of claim 3 wherein said receiver comprises gate means for applying said information signals to said storage means, means for selectively generating comparison signals corresponding to said identification signals, means for comparing said received identification signals and comparison signal for producing a control signal when said comparison signal and identification signal correspond to the same frame, and means for applying said control signal to said gate means.

6. The system of claim 5 wherein said means for comparing comprises an input register for storing the last received identification signals, a second register for storing the last selected comparison signals, and coincidence means for comparing the signals stored in said input and second registers.

7. The system of claim 6 wherein said receiver comprises a third register, means for clearing said second register and storing the cleared information in said third register, and said comparing means comprises means for comparing signals in said input and third registers.

8. A method for transmitting and receiving an educational television program of a plurality of instruction frames, comprising producing information signals corresponding to said frames, producing frame identifying signals, transmitting said information signals and identifying signals in cyclically repeated sequences, each said sequence including all of the information signals corresponding to all of said instruction frames, receiving said transmitted information and identifying signals, selecting the received information signals corresponding to a desired frame by means of said identifying signals, storing the information signals corresponding to said desired frame, reproducing said desired frame in visual form from said stored information signals, and selecting received information signals corresponding to a second desired frame by means of information contained in the received form of said first reproduced frame.

9. An information transmission system for the transmission of information signals corresponding to a program of a plurality of frames, said system comprising a transmitter and a receiver, said transmitter comprising means for producing frame identifying signals, and means for cyclically transmitting said information signals and identification signals in sequences, whereby the information signals corresponding to all frames are transmitted sequentially in each sequence, said receiver comprising means for receiving said transmitted signals, storage means, means for generating a first selection signal, means responsive to said identification signals and said selection signal for applying information signals corresponding to a predetermined frame to said storage means, transducer means for reproducing the information stored in said storage means, means for generating a second selection signal correlated to information contained in said predetermined frame, and means responsive to said identification signals and said second selection signal for applying information signals corresponding to a second predetermined frame to said storage means and said transducer means.

10. An information transmission system for the transmission of an educational television program of the type wherein said program comprises a plurality of information frames, said system comprising a transmitter and a receiver, said transmitter comprising means for producing information signals corresponding to frames of said program, means for producing frame identification signals, and means for cyclically transmitting said information signals and identification signals in sequences, whereby during each sequence the information signals corresponding to successive frames are successively transmitted, said receiver comprising means for receiving said transmitted signals, storage means, means for generating a first selection signal, means responsive to said identification signals and said selection signal for applying signals corresponding to a predetermined frame to said storage means, transducer means connected to said storage means for continuously reproducing said predetermined frame in visual form, means for generating a second selection signal correlated to information contained in said predetermined frame, and means responsive to said identification signals and said second selection signal for applying information signals corresponding to a second predetermined frame to said storage means and said transducer means.

References Cited

UNITED STATES PATENTS

| | | | |
|---|---|---|---|
| 3,371,321 | 2/1968 | Adams | 35—8 |
| 3,383,781 | 5/1968 | Divzet | 35—9 |

ROBERT L. GRIFFIN, Primary Examiner

B. LEIBOWITZ, Assistant Examiner

U.S. Cl. X.R.

178—6